United States Patent
Kalisch

(10) Patent No.: US 6,789,768 B1
(45) Date of Patent: Sep. 14, 2004

(54) BORDERED FLYING TOOL

(75) Inventor: Gad Kalisch, Kiriat Tivon (IL)

(73) Assignee: Steadicopter Ltd, Kibbutz Kfar Maccabi (IL)

( * ) Notice: Subject to any disclaimer, the term of this patent is extended or adjusted under 35 U.S.C. 154(b) by 0 days.

(21) Appl. No.: 09/979,680

(22) PCT Filed: May 25, 2000

(86) PCT No.: PCT/IL00/00298

§ 371 (c)(1),
(2), (4) Date: Mar. 20, 2002

(87) PCT Pub. No.: WO00/73727

PCT Pub. Date: Dec. 7, 2000

(30) Foreign Application Priority Data

May 27, 1999 (IL) ................................................. 130158

(51) Int. Cl.$^7$ ............................................. B64C 13/20
(52) U.S. Cl. ................. 244/190; 244/189; 244/175
(58) Field of Search ................. 244/175, 189, 244/190, 194, 184

(56) References Cited

U.S. PATENT DOCUMENTS

| | | | |
|---|---|---|---|
| 2,941,753 A | * 6/1960 | Ripper | ................. 244/190 |
| 3,742,495 A | 6/1973 | Diamantides | |
| 3,935,557 A | * 1/1976 | Nichols | ................. 340/948 |
| 4,231,093 A | * 10/1980 | LaVance et al. | ............ 701/300 |
| 4,234,924 A | * 11/1980 | La Vance et al. | ........... 701/300 |
| 4,398,195 A | 8/1983 | Dano | |
| 4,490,719 A | 12/1984 | Botwin | |
| 4,687,975 A | 8/1987 | Suzuki | |
| 4,748,569 A | * 5/1988 | Gordon | ................. 701/302 |
| 4,875,646 A | * 10/1989 | Browning et al. | ........... 244/190 |
| 5,067,674 A | 11/1991 | Heyece et al. | |
| 5,608,758 A | 3/1997 | Sakuma et al. | |
| 5,785,281 A | * 7/1998 | Peter et al. | ................. 244/190 |

* cited by examiner

Primary Examiner—Michael J. Carone
Assistant Examiner—Gabriel S. Sukman
(74) Attorney, Agent, or Firm—Shalom Werts Berger; Saltamar Innovations

(57) ABSTRACT

Differential Global Positioning System receivers (60) are located at the corners of a confined zone and receive signals from Global Positioning System satellites (62). The Differential Global Positioning System receivers (60) aid an aircraft (16) to fly and flight path or combing patten (20) over the confined zone. A vehicle (12) with a trailer (14) may be used to transport the aircraft (16) for use over the confined zone.

9 Claims, 5 Drawing Sheets

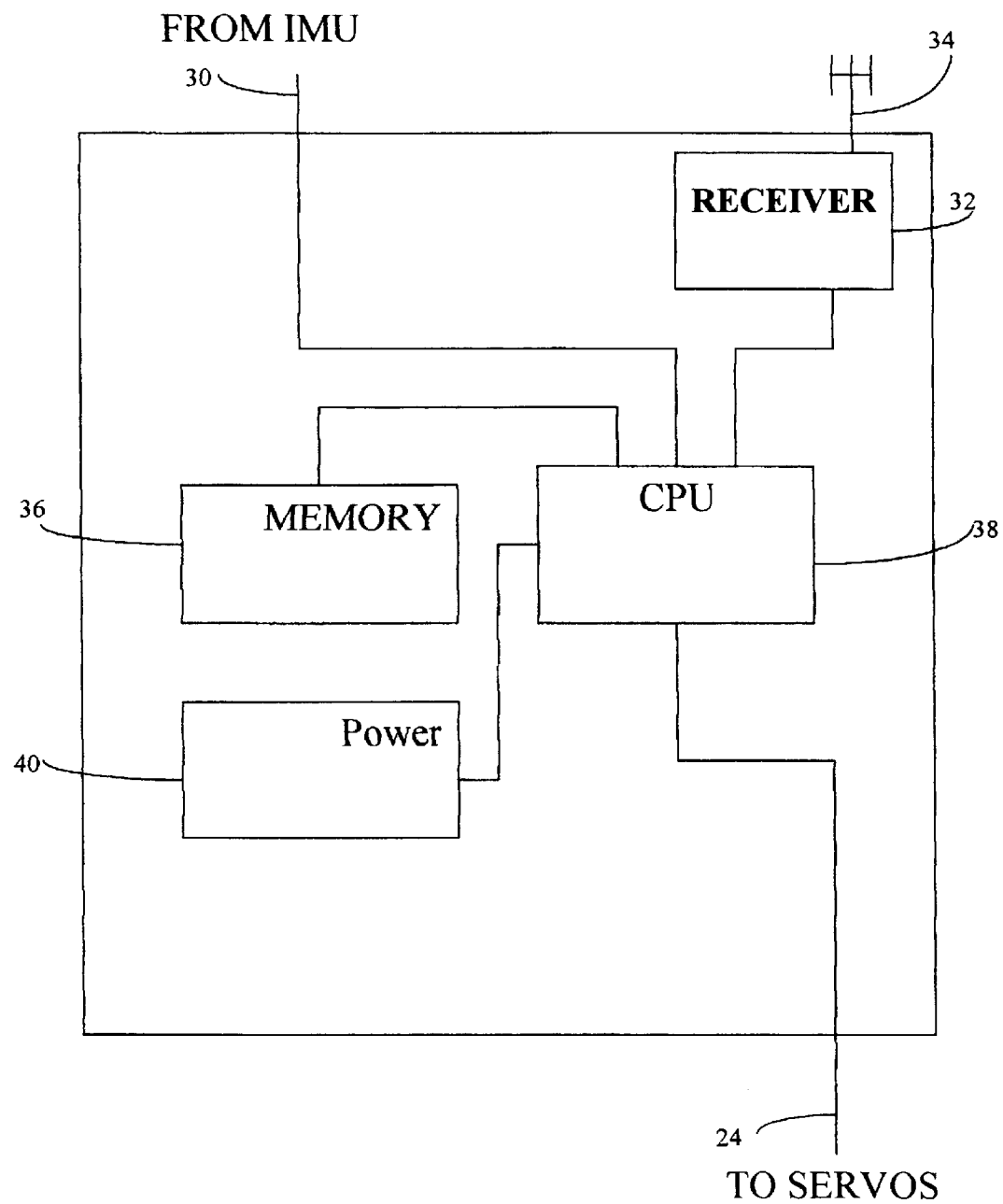

BORDERED FLYING TOOL

FIELD OF THE INVENTION

The present invention relates to automated motion of devices, and more particularly, the present invention relates to a system and method of automatically controlled motion of unmanned aircraft confined within predetermined boundaries.

BACKGROUND OF THE INVENTION

To-date crop dusting is carried out either by a pilot flying a duster plane, and applying the dusting manually on each run. Alternatively, a dusting vehicle, driven on the ground, is used, but this usually proves to be harmful to the crops as the vehicle runs over crops as it advances in the field.

Unmanned aircraft is also known to have been used for crop dusting, which is remotely controlled from the ground, and depends utterly on very skilled operators to fly it successfully. Night crop-dusting is practically impossible with remote-controlled flown duster, as flying it demands good visibility. Furthermore, controlling a remote-controlled unmanned aircraft from the ground is a demanding task taking its toll by increasing the operator's fatigue and therefore is not suited for long operations.

Unmanned remotely controlled flying machines have been known for years. Remote-controlled flying models are used for military tasks, such as reconnaissance missions, as well as civilian purposes, such as recreational model flying.

Unmanned aircrafts usually are controlled with remote control units operated at ground level. Examples of remote control units for unmanned aircraft are described in U.S. Pat. No. 5,067,674 (Heyche et al.), U.S. Pat. No. 5,608,758 (Sakuma et al.), U.S. Pat. No. 4,687,975 (Suzuki) and U.S. Pat. No. 4,177,426 (Gaishin et al.), all incorporated herein by reference. It is also possible to operate the remote control on board an aircraft.

However, controlling remotely controlled aircraft requires high skills in operating the remote control unit, as well as utmost attention to the aircraft, its position, heading, pitch, elevation, and speed. Furthermore, flying remotely controlling aircraft is limited to the operator's view range, which may vary depending on the terrain conditions.

It should be noted that when communication between the aircraft and the remote control unit is broken, the aircraft may still be able to fly, and this can result in the aircraft going astray, flying off beyond the controllers capacity of regaining control on it and repossessing it.

To the best knowledge of the inventor, there exist unmanned aircraft systems that use computerized maps for navigation. The starting position of the aircraft (i.e. takeoff point or a predetermined position which the aircraft initially reaches) is inputted to the control unit and the aircraft is made to follow a prescribed route which is calculated by an onboard (or distant) computing unit with reference to the GPS coordinates.

Satellite tracking systems are also known for some years. The Global Positioning System (GPS), based on high orbiting satellite network, is used in tracking and locating objects on the surface of the Earth. For example, U.S. Pat. No. 5,119,102 (Barnard) and U.S. Pat. No. 4,359,733 (O'Neill) disclosed satellite-based vehicle position determining systems. U.S. Pat. No. 5,587,929 (League), and U.S. Pat. No. 5,668,739 (League), describe systems and methods for tracking objects using a detection system (GPS).

BRIEF DESCRIPTION OF THE INVENTION

It is suggested that confining the motion of remotely controlled unmanned aircraft within predefined boundaries will allow better control of the aircraft, as well as allow the performance of automated tasks within these boundaries.

It is an object of the present invention to provide a system and method of an automatically controlled motion of unmanned aircraft confined within predetermined boundaries.

Another object of the invention is to provide a system and method of an automated unmanned aircraft operating in a confined zone, which can be used for crop dusting or any other routine job within the confined area without or with very little human intervention.

Yet another object of the present invention is to provide such a system and method that does not require the operator to posses special skills in order to be able to operate it.

Another object of the present invention is to provide such system and method that uses a location system (such as the GPS) to determine the position of the aircraft.

Another object of the present invention is to provide such system and method that allows fully automated operation of the aircraft in the confined zone.

An aspect of the present invention is the use of a tracking system, such as the Global Positioning System (GPS). Another aspect of the present invention is the confinement of the aircraft to a predetermined confined zone. Another aspect is the provision of fully automated flight of the aircraft within that confined zone.

There is thus provided, in accordance with a preferred embodiment of the present invention, a system of automatically controlled motion of unmanned aircraft confined within predetermined boundaries, the system comprising:

registration means for registering reference points located at the boundaries of a predefined zone;

an unmanned aircraft comprising a body of an aircraft adapted for flying, the body provided with control means for controlling its flight, and control unit, the control unit adapted to communicate with the registration means, determine the location of the reference points and determine the aircraft position with respect to the reference points, said control unit further adapted to actuate the control means so as to allow the aircraft to fly only within the boundaries of the predetermined zone.

Furthermore, in accordance with a preferred embodiment of the present invention, said tracking system is a satellite base tracking system.

Furthermore, in accordance with a preferred embodiment of the present invention, said satellite based tracking system is GPS.

Furthermore, in accordance with a preferred embodiment of the present invention, said means for registering comprise a plurality of beacons adapted to transmit signals of predetermined frequencies traceable by said control unit, and wherein said control unit is adapted to determine the location of the aircraft relative to said beacons, by comparing the frequencies, detecting changes in them and determining the aircraft location with respect to said beacons by comparing the time that takes each signal to reach the control unit.

Furthermore, in accordance with a preferred embodiment of the present invention, said aircraft is adapted to fly in a predetermined pattern within the confined zone.

Furthermore, in accordance with a preferred embodiment of the present invention, said aircraft is a helicopter.

Furthermore, in accordance with a preferred embodiment of the present invention, said aircraft is adapted to be controlled with a remote control unit operated on the ground, and when the system detects that aircraft approaches the confined zone boundary the control unit overrides the remote control unit and forces the aircraft to remain within the confined zone.

Furthermore, in accordance with a preferred embodiment of the present invention, the registering means comprise at least one portable beacon adapted to be positioned at a reference point and transmit signals traceable by the tracking system, and wherein said control unit is adapted to determine the location of the aircraft relative to the reference points.

Furthermore, in accordance with a preferred embodiment of the present invention, there is provided a system of automatically controlled motion of unmanned aircraft confined within predetermined boundaries, the system comprising:

registration means for registering reference points located at the boundaries of a predefined zone in GPS coordinates;

an unmanned aircraft comprising a body of an aircraft adapted for flying, the body provided with control means for controlling its flight, and control unit, the control unit adapted to communicate with the registration means, determine the location of the reference points and determine the aircraft position with respect to the reference points, said control unit further adapted to actuate the control means so as to allow the aircraft to fly only within the boundaries of the predetermined zone.

Furthermore, in accordance with a preferred embodiment of the present invention, there is provided a method of automatically controlled motion of unmanned aircraft confined within predetermined boundaries, the method comprising:

providing registration means for registering reference points located at the boundaries of a predefined zone;

providing an unmanned aircraft comprising a body of an aircraft adapted for flying, the body provided with control means for controlling its flight, and control unit, the control unit adapted to communicate with the registration means, determine the location of the reference points and determine the aircraft position with respect to the reference points, said control unit further adapted to actuate the control means so as to allow the aircraft to fly only within the boundaries of the predetermined zone;

registering the location reference points located at corners of the confined zone;

flying the aircraft within the confined zone; and the aircraft's location with respect to the reference points and diverting the aircraft when it approaches the boundary of the confined zone.

BRIEF DESCRIPTION OF THE DRAWINGS

In order to better understand the present invention, and appreciate its practical applications, the following Figures are provided and referenced hereinafter. It should be noted that the Figures are given as examples only and in no way limit the scope of the invention as defined in the appending claims.

FIG. 2B is a block diagram showing optional electronic set-up for the aircraft of FIG. 2A.

DETAILED DESCRIPTION OF THE INVENTION

The present invention aims at providing a system and method of an automatically controlled motion of unmanned aircraft confined within predetermined boundaries. It provides good means for restraining the motion of an unmanned aircraft within a known zone of predetermined borders.

Within these well-defined boundaries the aircraft is set to fly either on a predefined course, such as in circles, or in a combing manner, systematically covering the zone confined by the boundaries, or in any other predetermined pattern. Alternatively the aircraft may be controlled with a remote control unit, as long as it stays within the confined zone, but upon approaching the boundary, the remotely controlled motion of the aircraft would be overridden by the system of the present invention so as to prevent the aircraft from passing beyond the boundary.

In view of the nature of the confinement imposed by the system of the present invention, changing the course of the aircraft abruptly upon approaching the boundary, the present invention seems to appeal in particular to aircraft traveling at low speeds (such as helicopters). However it may also be implemented on fast aircraft, for example by introducing transitional measures (such as altering the course of the aircraft sufficient time before it reaches the boundary in order to allow it to complete a turn).

An aspect of the present invention is the employment of a tracking system, such as the Global Positioning System (GPS), or any other tracking system. The tracking system is used in determining the boundaries of the confined zone and in determining the aircraft position within these boundaries.

The present invention is explained hereafter with reference to three embodiments, as shown in the accompanying drawings. These embodiments are given for the purpose of clarity and in no way limit the scope of the present invention, as defined in the appended claims.

Figure 1:
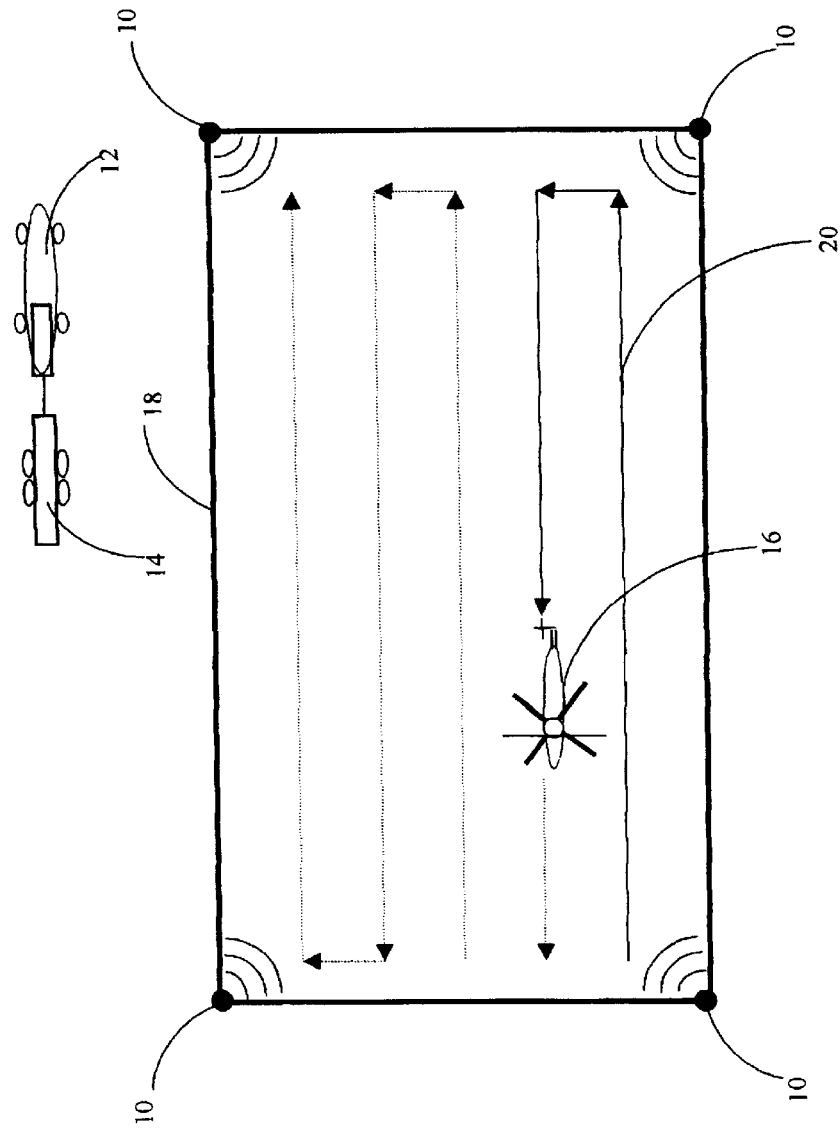

Reference is made to FIG. 1, illustrating an outline view of a system of automatically controlled motion of unmanned aircraft confined within predetermined boundaries, in accordance with a preferred embodiment of the present invention.

In order to set up the boundaries of the confined zone, a plurality of reference beacons 10 is deployed, positioned at the outer limits 18 of the confined zone. In case of a rectangular zone, as shown in FIG. 1, four beacons are deployed. In case of zones of different shapes, such as polygonal zones, the number of beacons deployed will preferably correspond to the number of corners in the particular polygon (3 points for a triangular zone, 4 points for rectangular zone, 5 points for pentagonal zone etc.). The beacons 10 are adapted to transmit synchronized signal (electromagnetic signal of high frequencies is preferable, as higher frequency increases system accuracy) that can be picked up by a receiver located onboard the aircraft—which, in the case of FIG. 1 is an unmanned helicopter 16. Preferably, the beacons are transportable, and may be repositioned on demand. A vehicle 12 with a trailer 14 may be used as means for transporting the aircraft from place to place, as well as serve as landing platform and as fueling station (if provided with a fuel tank). The aircraft in FIG. 1 is adapted to fly in a predetermined combing pattern 20 so as to cover systematically the entire confined zone area.

Figure 2A:
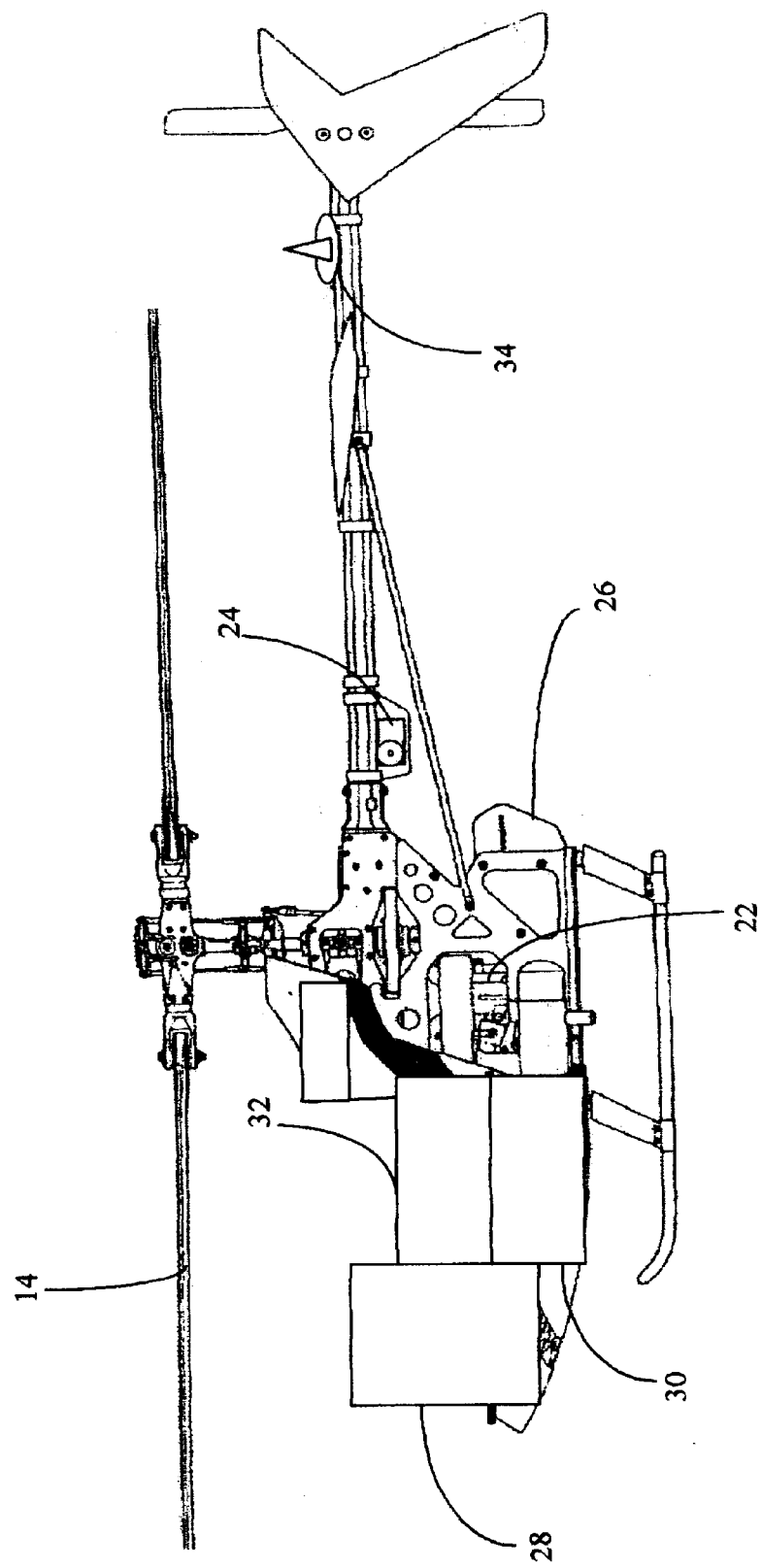
FIG. 2A depicts the general features of an aircraft used in the system of the present Invention.

FIGS. 2A and 2B depict the general features of an aircraft used in the system of the present invention. Helicopter 16 comprises a body 26 of an aircraft suitable for flying, the body provided with control means 24 that control its flight (servos controlling the helicopter's roll, elevation, yaw, rotor pitch, throttle, etc.—hereafter referred to as the controls), a motor 22 connected to a rotor 14, adapted to provide the aircraft lift and thrust needed for its flight, and a control unit 28, which controls the aircraft in flight. The helicopter is also provided with an IMU (inertial Measurement Unit) 30 that comprises inertial sensors (gyroscopes and accelerometers) for detecting the aircraft orientation with respect to the perpendicular and the horizontal axis (relating to the Earth). The IMU is employed in order to detect changes in the aircraft's inclination, in order to compensate and stabilize the aircraft. Data from the IMU is processed by the control unit, and after analyzing it the control unit sends the appropriate commands to the servos 24. On the tail an antenna 34 is provided connected to the control unit of the aircraft.

Control unit 28 (see FIG. 2B) comprises a receiver 32 adapted to receive via antenna 34, signals transmitted by the beacons 10. Receiver 32 is coupled to a central processing unit (CPU) 38. CPU 38 is adapted to receive the location data picked up by receiver 32 and determine whether the aircraft is within the predetermined boundaries defined by the beacons, and how far it is from the nearest boundary (in a manner explained herein). CPU 38 is also adapted to transmit commands to the aircraft controls 24 so as to divert the aircraft upon approaching the boundary, and alternatively it may also be provided with a programmed set of control commands, so as to command the controls and set the aircraft on a predetermined pattern within the boundaries (for example in a combing motion, as shown in FIG. 1, or in circles or in any other predetermined pattern).

The control unit also comprises memory 36 (which may be a volatile memory or ROM) for storing the location data of the beacons that was registered in advance. A power unit 40 powers the control unit.

The mode of operation of the preferred embodiment of the present invention is hereby explained with reference to the drawings.

First the boundaries of the confined zone are determined. The operator of the system, who does not need to be a skilled technician or a trained electrician or a flyer, takes the transportable beacons and places each beacon at a corner of the desired confined zone. This can be done by driving a vehicle along the desired zone's boundaries and dropping a beacon at every corner of the zone.

Then the aircraft is positioned within the confined zone or at a predetermined location outside the zone, and the operator initiates the flight by actuating the aircraft control unit.

The aircraft position is immediately registered by the control unit with reference to the beacons, as the simultaneous signal, which is transmitted by the beacons is picked up by the receiver, and analyzed by the control unit, to determine the exact location of the aircraft. The location method of an object by a tracking system is known (for example GPS system, ultrasonic systems, laser tracking systems etc.).

The beacons' location data may be stored in memory 36. The aircraft then takes off in the confined zone (or if in the air enters the confined zone). The CPU is adapted to compare the data of the aircraft's present location with the previously obtained data regarding the beacons location, and is adapted to calculate and determine the distance of the aircraft from the boundaries of the confined zone. When the determined distance of the aircraft from the boundary reaches within a predetermined value, be it any desired value—positive, zero or negative (if it is desired to allow the aircraft to fly within boundaries larger than the zone physically marked by the beacons, such as in the case of terrain conditions that make it impossible to position the beacons where it is desired to mark the actual boundaries), the CPU commands the controls to alter the aircraft heading, diverting its course.

The beacons transmit signals that are picked up by the control unit, and the control unit is adapted to determine the aircraft's speed and heading. This may be achieved by transmitting signals of predetermined frequencies from each beacon (each beacon's signal having a unique frequency). When the control unit travels away or towards each beacon the time that takes for the signal to reach from the beacon to the aircraft is proportional to the distance from that beacon, and this feature can be analyzed to determine the aircraft's relative position with respect to the beacon, and hence determine the aircraft's location within the confined zone.

In the case of the embodiment shown in FIG. 1 the CPU is further programmed to fly the aircraft in a sweeping course, where the aircraft flies in straight parallel lines, and upon approaching the boundary of the confined zone the aircraft is diverted to fly back (turning 180 degrees with respect to its previous course), in a path parallel to the path previously defined.

Figure 3A:
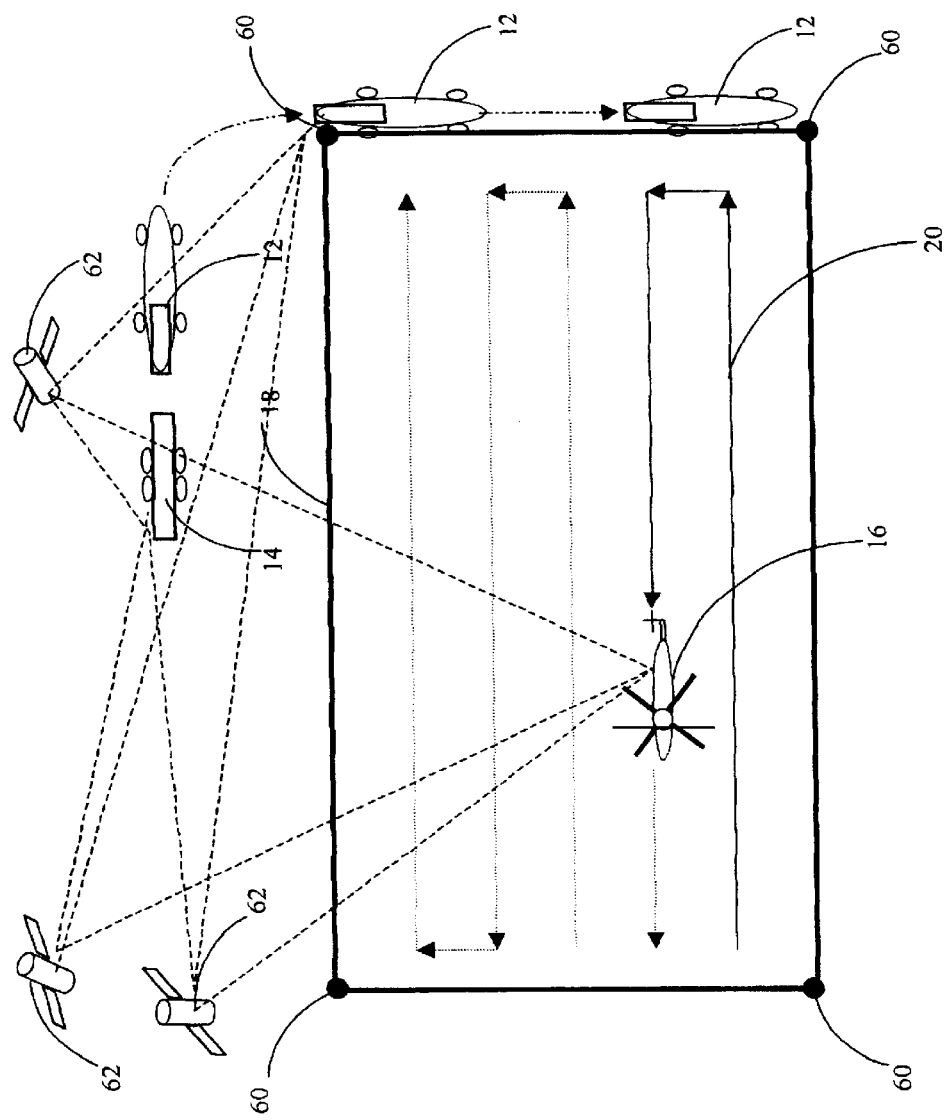
FIG. 3A illustrates an outline view of a system of an automatically controlled motion of unmanned aircraft confined within predetermined boundaries, in accordance with another preferred embodiment of the present invention.
Figure 3B:
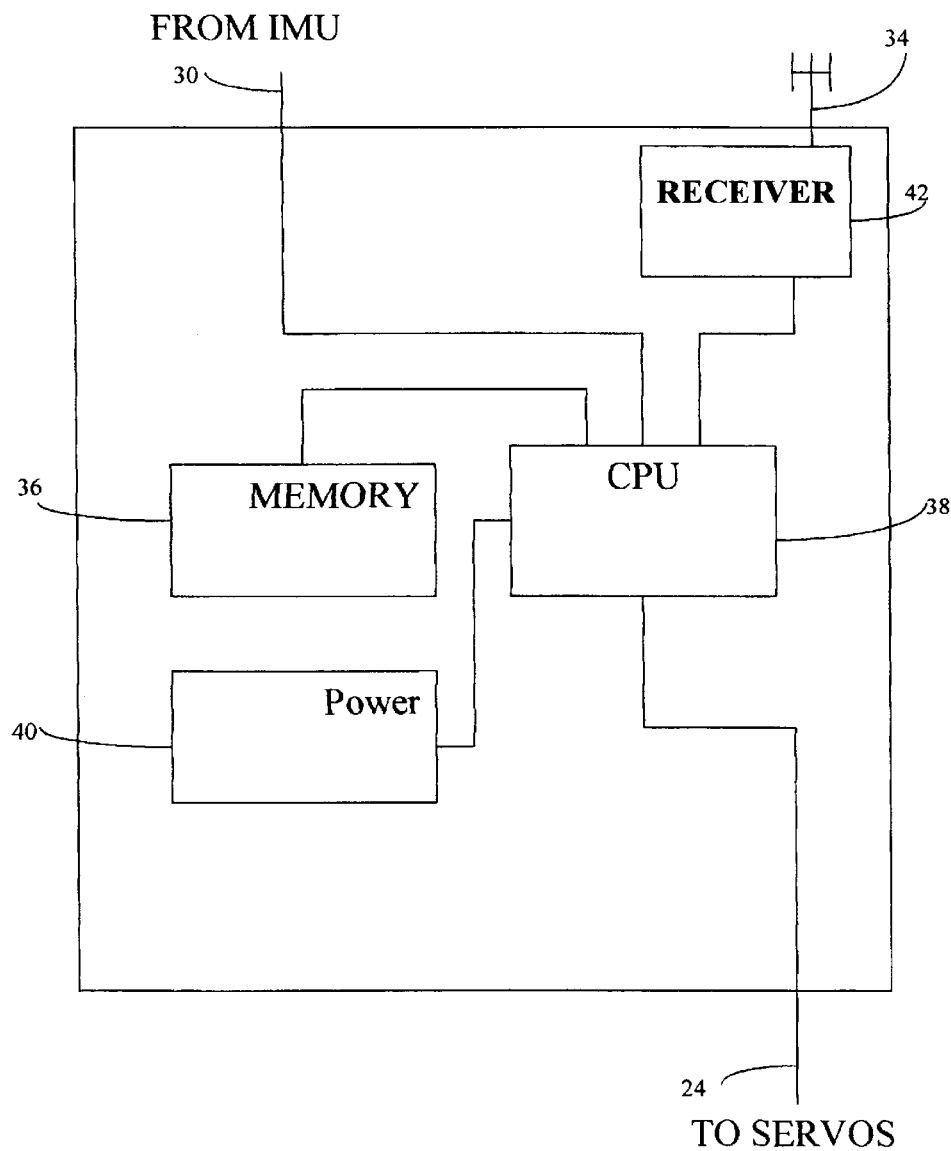
FIG. 3B is another simplified block diagram showing optional electronic set up for the aircraft.

FIG. 3A depicts another preferred embodiment of the present invention. In this embodiment, the tracking system employed is a GPS system. The GPS system is a global tracking system, based on a plurality of satellites deployed orbiting the Earth. At any given moment it is desired that at least five satellites are in view range of a given spot on earth in order to have good accuracy (in FIG. 3 only three satellites 62 are depicted for brevity).

Registration of the confined zone is carried out as follows: a DGPS receiver is carried or driven by the operator of the system and positioned consecutively at each corner 60 of the desired confined zone. When positioned at each corner 60 the operator registers the GPS coordinates. The DGPS (Differential Global Positioning System), which is a commercially available, is an enhanced GPS satellite-based tracking system which has a built-in ability to correct errors caused by interferences of electromagnetic fields, atmospheric changes etc. It comprises a stationary base (which may be positioned onboard trailer 14), and a mobile unit which is mounted onboard the aircraft 16) which intercommunicate. The stationary base is capable of determining its exact location by sampling the GPS signal over time and calculating its average position (determining a correcting factor), whereas the mobile unit is registered both with the GPS and the stationary base and thus its exact location relative to the base is determined (the correcting factor is taken into account).

The DGPS stationary base is positioned in a predetermined position within the desired confined zone, or in its vicinity, whereas the mobile unit (42 see FIG. 3B) is initially transported by the operator to each corner of the confined zone. The operator registers each corner of the confined zone with the DGPS mobile unit. Once the corners have been registered the mobile unit 42 is placed onboard the aircraft, where it is adapted to communicate with the CPU. The aircraft is made to take off and its position coordinates are constantly being monitored by the CPU and compared with the confined zone previously registered coordinates. If the aircraft reaches the boundary the CPU commands the controls to divert the aircraft and keep it within the confined zone.

The system of the present invention has many uses. The aircraft can be adapted to be used as a lifter, lifting loads (like a crane) in a confined zone (like a construction site, for example). The system may be used to provide boundaries for recreational model flying, so as to prevent the models going astray, or penetrating no-flight zones. The system may be used for routine aerial jobs, such as crop dusting, or banner flying (advertising), with the aircraft flying in a confined zone and sweeping the zone (as shown in FIG. 1). These are but some of the tasks and purposes of the present invention, and many more uses are applicable.

The control unit may optionally be adapted to control the stability of the aircraft, its heading and elevation, using the IMU to provide data to the CPU relating to the aircraft position and orientation, and by adjusting the controls automatically upon detection of unintended diversion or inclination from the desired course.

It should be clear that the description of the embodiments and attached Figures set forth in this specification serves only for a better understanding of the invention, without limiting its scope as covered by the following claims.

It should also be clear that a person skilled in the art, after reading the present specification could make adjustments or amendments to the attached figures and above described embodiments that would still be covered by the following claims.

What is claimed is:

1. A system of automatically controlled motion of unmanned aircraft confined within predetermined boundaries, operating in conjunction with a satellite-based tracking system, the system comprising:

reference points located at predetermined positions relative to the boundaries of a predefined zone, wherein the reference points location is determined by said tracking system;

an unmanned aircraft comprising a body of an aircraft suitable for flying, the body provided with controls for controlling its flight, and control unit, the control unit communicating with the tracking system, determining the aircraft position with respect to the reference points, said control unit further capable of actuating the controls so as to allow the aircraft to fly only within preset boundaries of the predetermined zone.

2. The system according to claim 1, wherein said satellite based tracking system is GPS.

3. The system according to claim 1, wherein said reference points comprise a plurality of beacons adapted to transmit signals of predetermined frequencies traceable by said control unit, and wherein said control unit is adapted to determine the location of the aircraft relative to said beacons, by comparing the frequencies, detecting changes in them and determining the aircraft location with respect to said beacons by comparing the time that takes each signal to reach the control unit.

4. The system according to claim 1, wherein said aircraft is made to fly in a predetermined pattern within the predetermined zone.

5. The system according to claim 1, wherein said aircraft is a helicopter.

6. The system according to claim 1, wherein said aircraft is adapted to be controlled with a remote control unit operated on the ground, and when the system detects that aircraft approaches the confined zone boundary the control unit overrides the remote control unit and forces the aircraft to remain within the confined zone.

7. The system according to claim 1, wherein the reference points comprise each a portable beacon adapted to be positioned at a reference position and transmit signals traceable by the tracking system, and wherein said control unit determines the location of the aircraft relative to the reference points.

8. A system of automatically controlled motion of unmanned aircraft confined within predetermined boundaries, operating in conjunction with a GPS tracking system, the system comprising:

reference points located at predetermined positions relative to the boundaries of a predefined zone in GPS coordinates, wherein the location of said reference points is determined by said GPS tracking system;

an unmanned aircraft comprising a body of an aircraft suitable for flying, the body provided with controls for controlling its flight, and control unit adapted to determine the aircraft position with respect to the reference points, said control unit further capable of actuating the controls so as to allow the aircraft to fly only within the boundaries of the predetermined zone.

9. A method of automatically controlled motion of unmanned aircraft confined within predetermined boundaries, the method comprising providing reference points located at predetermined positions relative to the boundaries of a predefined zone, whose location may be determined by a tracking system;

providing an unmanned aircraft comprising a body of an aircraft adapted for flying, the body provided with controls for controlling its flight, and control unit, the control unit communicating registration means, and determining the aircraft position with respect to the reference points, said control unit further capable of actuating the controls so as to allow the aircraft to fly only within the boundaries of the predetermined zone;

registering the location reference points located at corners of the confined zone by the tracking system;

flying the aircraft within the confined zone; and comparing the aircraft's location with respect to at least a subset of the reference points and diverting the aircraft in a predetermined pattern when it approaches the boundary of the confined zone.

* * * * *